United States Patent
Guo et al.

[11] Patent Number: 6,062,137
[45] Date of Patent: May 16, 2000

[54] APPLICATION OF SPECTRAL MODELING THEORY IN DEVICE-INDEPENDENT COLOR SPACE HALFTONING

[75] Inventors: Shilin Guo; Guo Li, both of San Diego, Calif.

[73] Assignee: Hewlett-Packard Company, Palo Alto, Calif.

[21] Appl. No.: 09/080,090

[22] Filed: May 17, 1998

[51] Int. Cl.$^7$ .................................................. B41F 1/10
[52] U.S. Cl. ........................... 101/171; 400/76; 400/70; 400/61; 400/62
[58] Field of Search ...................... 347/19, 222; 358/518, 358/522; 101/171; 395/112, 114, 115, 116, 117, 118, 119; 382/162–167; 400/76, 70, 761, 62

[56] References Cited

U.S. PATENT DOCUMENTS

| | | | |
|---|---|---|---|
| 5,070,413 | 12/1991 | Sullivan | 358/456 |
| 5,276,459 | 1/1994 | Danzuka et al. | 346/33 |
| 5,333,243 | 7/1994 | Best | 395/109 |
| 5,353,052 | 10/1994 | Suzuki et al. | 347/19 |
| 5,377,024 | 12/1994 | Dillinger | 358/502 |
| 5,473,446 | 12/1995 | Perumal, Jr. | 358/523 |
| 5,510,910 | 4/1996 | Bockman | 358/502 |
| 5,528,386 | 6/1996 | Rolleston et al. | 358/522 |
| 5,537,228 | 7/1996 | Dillinger | 358/502 |
| 5,594,557 | 1/1997 | Rolleston et al. | 358/518 |
| 5,621,545 | 4/1997 | Motta | 358/518 |
| 5,657,137 | 8/1997 | Perumal, Jr. | 358/502 |
| 5,710,827 | 1/1998 | Perumal, Jr. | 382/167 |
| 5,748,221 | 5/1998 | Castelli et al. | 347/232 |

OTHER PUBLICATIONS

U.S. application No. 08/238,137, filed May, 3, 1994, Dillinger.

Primary Examiner—John Hilten
Assistant Examiner—Charles H. Nolan, Jr.
Attorney, Agent, or Firm—Dennis G. Stonstrom

[57] ABSTRACT

Disclosed is a new printing apparatus and process for inkjet printers which incorporates spectral modeling of ink mixing and the technology of halftoning in device-independent color space. In addition no colormap building or color mapping processing is necessary, because color correction is conducted in device-independent space and is built into the halftoning process. also disclosed is an automatic self-calibration by the printer without user intervention or user preferences by using an optical sensing unit on the printer. The procedure corrects for print cartridge to print cartridge variance, and variance of print cartridges over time and also provides for faster processing of color images.

12 Claims, 8 Drawing Sheets

APPLICATION OF SPECTRAL MODELING THEORY IN DEVICE-INDEPENDENT COLOR SPACE HALFTONING

CROSS-REFERENCE TO RELATED PATENTS AND APPLICATIONS

This application is related to U.S. Pat. No. 5,070,413, entitled "Color Digital Halftoning with Vector Error Diffusion"; U.S. Pat. No. 5,333,243, entitled "Method for Forming Color Images Using a Hue-Plus-Gray Color Model;" U.S. Pat. No. 5,377,024, entitled "Apparatus for Forming Color Images Using a Hue-Plus-Gray Color Model;" U.S. Pat. No. 5,333,243, entitled "Error Diffusion Applied to HNK Color Model;" U.S. Pat. No. 5,473,446, entitled "Color Digital Halftoning Using Black and Secondary Color Replacement and Color Vector Dithering;" U.S. Pat. No. 5,621,545, entitled "Image Production Using Color Error Diffusion". U.S. Pat. No. 5,657,137, entitled "Color Digital Halftoning Using Black and Secondary Color Replacement;" U.S. Pat. No. 5,710,827, entitled "Halftone Dither Cell with Integrated Preferred Color Matching;" U.S. patent application Ser. No. 08/238,137, filed May 3, 1994, entitled "Coordinating Color Produced by Two Devices Using a Hue-Controlled Machine Color Space or Surface Scanning;" U.S. patent application Ser. No. 08/789,859, filed Jan. 28, 1997, entitled "Image Rendition by Plural-Row Error Diffusion, for Faster Operation & Smaller Integrated Circuits;" U.S. patent application Ser. No. 08/960,766, filed Oct. 30, 1997, entitled "Constructing Device-State Tables for Inkjet Printing;" U.S. patent application Ser. No. 08/960,779, filed Oct. 30, 1997, entitled "Device State Error Diffusion Technique for Halftoning;" U.S. patent application Ser. No. 08/961,730, filed Oct. 31, 1997, entitled "Method and Apparatus for Ink Jet Printer Color Balance Calibration;"and U.S. patent application Ser. No. 09/042,880, filed Mar. 16, 1998, entitled "Banding Reduction in Incremental Printing, Through Use of Asymmetrical Randomized Superpixels." The foregoing commonly assigned patents and patent applications are herein incorporated by reference.

FIELD OF THE INVENTION

This invention relates to digital color halftoning in printers that employ conversion of received computer-generated color values to inkjet printer color values to create a full-color representation of an image and more particularly, to a digital color printer using device independent color space procedures that enable improved full-color representation of an image.

BACKGROUND OF THE INVENTION

Thermal inkjet hardcopy devices such as printers, graphics plotters, facsimile machines and copiers have gained wide acceptance. These hardcopy devices are described by W. J. Lloyd and H. T. Taub in "Ink Jet Devices," Chapter 13 of *Output Hardcopy Devices* (Ed. R. C. Durbeck and S. Sherr, San Diego: Academic Press, 1988). The basics of this technology are further disclosed in various articles in several editions of the *Hewlett-Packard Journal* [Vol. 36, No. 5 (May 1985), Vol. 39, No. 4 (August 1988), Vol. 39, No. 5 (October 1988), Vol. 43, No. 4 (August 1992), Vol. 43, No. 6 (December 1992) and Vol. 45, No. 1 (February 1994)], incorporated herein by reference. Inkjet hardcopy devices produce high quality print, are compact and portable, and print quickly and quietly because only ink strikes the paper.

An inkjet hardcopy device forms a printed image by printing a pattern of individual dots at particular locations of an array defined for the printing medium. The locations are sometimes referred to as dot locations, dot positions, or pixels. The locations are conveniently visualized as being small dots in a rectilinear array. Inkjet hardcopy devices print dots by ejecting very small drops of ink onto the print medium and typically include a movable carriage that supports one or more print cartridges each having ink ejecting nozzles. The carriage traverses over the surface of the print medium, and the nozzles are controlled to eject drops of ink at appropriate times pursuant to command of a microcomputer or other controller, wherein the timing of the application of the ink drops is intended to correspond to the pattern of pixels of the image being printed. The ink cartridge containing the nozzles is moved repeatedly across the width of the medium to be printed upon. After each such completed movement or swath the medium is moved forward and the ink cartridge begins the next swath. By proper selection and timing of the signals, the desired print is obtained on the medium. Thus, the printing operation can be viewed as the filling of a pattern of dot locations with drops of ink.

Color itself can be discussed according to three different characteristics. These do not take into account all the variables of color but do handle the subject sufficiently to explain color printing. The "hue" of color is the actual color appearance, i.e. red, green, purple, orange, blue-green, etc. The hue is the characteristic which gives color a basic name. The second characteristic comes from the fact that some colors cannot be classified as hues, i.e. black, gray, and white. These are called achromatic colors. The presence of gray in a color is an inverse measurement of the "chroma" and can be described as the color's intensity or saturation. The more gray, the less intense and vice versa. The third characteristic is defined as "value" in the Munsell color system and describes the color's lightness or darkness. Thus, you can have a light blue or a dark green, and both can be intense (lacking gray) in reference to their chroma.

RGB is a color space that uses as its primary colors red, green, and blue. These three colors are the primary "additive" colors. In devices that use projected light to produce an image (for example, televisions or computer monitors), the complete spectrum of colors can be reproduced using red, green, and blue. All three primary additive colors combine to form white. Any other color can be produced by combining different amounts of the three primary colors.

CMY is a color space that uses as its primary colors cyan, magenta and yellow. These four colors are the primary "subtractive" colors, because when printed on paper, the CMY colors subtract some colors while reflecting others. In devices that use reflected light to produce an image, the complete spectrum of colors can be reproduced using cyan, magenta and yellow. In theory, all three primary subtractive colors combine to form black. However, it is sometimes difficult to get a satisfying black using a given set of cyan, magenta and yellow inks, so many reflective color-based products add a "true" black color, k, hence the color set CMYK. The CMYK color set is sometimes called "process color."

Digital image data must be transformed or pre-processed so that different devices will all render an image represented by the image data in a similar way. A pre-processor associated with or configured for each such output device transforms the digital data to a form tailored to the characteristics of that particular device.

In order to reproduce a received color value, a color inkjet printer must convert or map the color value into a color command that is recognized by the inkjet printer. A color management system assures that the colors produced by one product (a printer, scanner, monitor, film recorder, etc.) match those produced on other products. Color management systems typically have two components, "profiles" of individual color products that specify the color capabilities of the device and software that runs on a host computer that uses this information to insure that the colors produced by one product match those produced by another.

The color management system adjusts or maps the color values in accordance with a predetermined calibration function so as to assure that the printed colors will appear the same as the colors displayed on the display device. At the same time, the red, green and blue values are converted to Cyan, yellow, and magenta values. An additional value is supplied for a black (K) dot to be applied at a pixel location. In cases where a particular color is not within the color gamut of a target device (i.e. the target device simply is incapable of reproducing the color), the color management software must provide the closest possible match.

Device independent color is a term describing a computer system capable of reproducing a color accurately on any attached color device (printer, monitor, scanner, etc.). Device-independent color space is a system for mathematically defining color. Many different color spaces exist, including RGB (red, green, blue), CMYK (cyan, magenta, yellow, black), and numerous device-independent color spaces such as Munsell, CIEXYZ, CIELAB and CIELUV.

In an inkjet printer, a color spot printed in a pixel position on a medium may consist of a number of overlapping dots of the same color ink or different color inks. As one example, a four color ink printer printing any combination of cyan, magenta, yellow, and black dots for a pixel position with, at most, one dot per color for a single pixel position can produce 16 different colors for a single pixel position without halftoning. If multiple drops (e.g., four) of the same color ink can be used when creating a color spot, the possible color combinations without halftoning can be over 10,000.

The possible color spots which can be printed by a particular printer is sometimes referred to as a palette of colors. Typically, the number of RGB colors that can be generated by a computer and displayed on the computer's display screen is much more than the palette of colors available for a particular printer. Thus, there will typically be some error between the color spot printed for a pixel and the ideal RGB color generated by the computer for that pixel position.

Most color inkjet hardcopy devices are binary in nature because they either apply a full color dot or no color dot to a pixel location. Such color printers do not employ a control mechanism to enable adjustment of the intensity of a particularly applied color dot. As a result, a printer driver for a binary color printer employs a color halftoning process. Digital halftoning refers to any process that creates the illusion of continuous tone images by judicious arrangement of picture elements, such as ink drops in the case of inkjet printers. The dots are placed in such a way that they appear to the human eye to be a single color. Dithering can be used to reproduce gray shades using only black ink, or a fuller spectrum of color using only the process colors cyan, magenta, yellow, black. For example, to produce green, a color printer lays down patterns of small yellow and cyan dots that appear to the eye to be green.

In general, there are two families of halftoning techniques, dithering and error diffusion. Dithering involves a dither cell which is a two dimensional matrix of threshold values. Pixel values are compared to corresponding threshold entries in the dither cell to determine if they should be snapped up or down. In this way a shade of red for example can only be converted to full red or no red. Dithering in general benefits from ease of implementation. It can be done very quickly in a printer and it fits in very nicely in different print architectures.

Error diffusion is a technique for laying down dots of the primary colors to produce the full spectrum of color. Error diffusion techniques use complex algorithms to lay down dots of color in a random rather than a repeated pattern, which improves the quality of the image. In error diffusion, the error between the actual color printed by the printer and the true tone value to be reproduced for that pixel position is dispersed to nearby pixel positions. The colors then printed in those nearby pixel positions will compensate for the tone errors in other nearby color spots so that the overall tone in an area on the medium closely matches the true tone generated by the computer. Thus, error diffusion makes the best approximation it can for a given pixel, calculates how far that approximation is from the ideal and propagates this "error" to neighboring pixels. In this way a given pixel may not be particularly accurate but a surrounding area will be. In general, error diffusion benefits from much better print quality than dithering. Typically, intense calculation is required to create the random pattern, so printing images using error diffusion is slower than using pattern dithering.

There is also usually a restriction on the amount of computational complexity that can be accepted. A "point operation" in image processing refers to any algorithm which produces output for a given location based only on the single input pixel at that location, independent of its neighbors. Thus, in point operation, halftoning is accomplished by a simple pointwise comparison of the input image against a predetermined threshold array or mask. For every point or pixel in the input image, depending on which point value is larger, the gray scale image or the mask, either a 1 or 0, respectively, is placed at the corresponding location in the binary output image. While various masks may be used, the general procedure for point halftoning is known. For applications where minimizing computation time and/or hardware is a premium, a point operation is preferred. Error diffusion, also called a neighborhood operation, is more computationally intensive, but generally produces higher quality results.

Color accuracy becomes more critical for color inkjet printers, as their print quality improves to near photographic. Most inkjet printers do not have the capability of self color calibration. Most printer drivers only allow users the ability to control curve shapes of RGB channels with sliders, based on the users' own impression of the prints. A printer user can interactively calibrate by printing numbers of gray images with various hue casts and contrast. The printer will automatically adjust color curves based on the best print picked by the user. In either of the above situations, print results depend heavily on users' preference and experience. For users lacking of experience in imaging or photography, color calibration is a painful job. In order to reproduce accurate color prints, it is necessary to have a color calibration process independent of user's preference. Moreover, due to print cartridge to print cartridge variance, the printed color of each individual printer maybe different.

Accordingly, there is a need for a method of color calibration which is independent of the preferences of a user and there is also a need for increasing the speed of color processing by eliminating the need to perform colormap building or color mapping processing.

SUMMARY OF THE INVENTION

The present invention provides a new printing process for inkjet printers which incorporates spectral modeling of ink mixing and the technology of halftoning in device-independent color space. In addition no colormap building or colormapping processing is necessary because color correction is conducted in device-independent space and is built into the halftoning process. The present invention also allows for automatic self-calibration of the printer without user intervention or user preferences by using an optical sensing unit on the printer. Moreover, the invention corrects for print cartridge to print cartridge variance, and variance of print cartridges over time. The invention also provides for faster processing of color images.

BRIEF DESCRIPTION OF THE DRAWINGS

FIG. 4 is a flowchart showing color image processing pipeline with halftoning conducted in printer-dependent space (FIG. 4A) and in device-independent space (FIG. 4B).

DETAILED DESCRIPTION OF A PREFERRED EMBODIMENT

Figure 1:
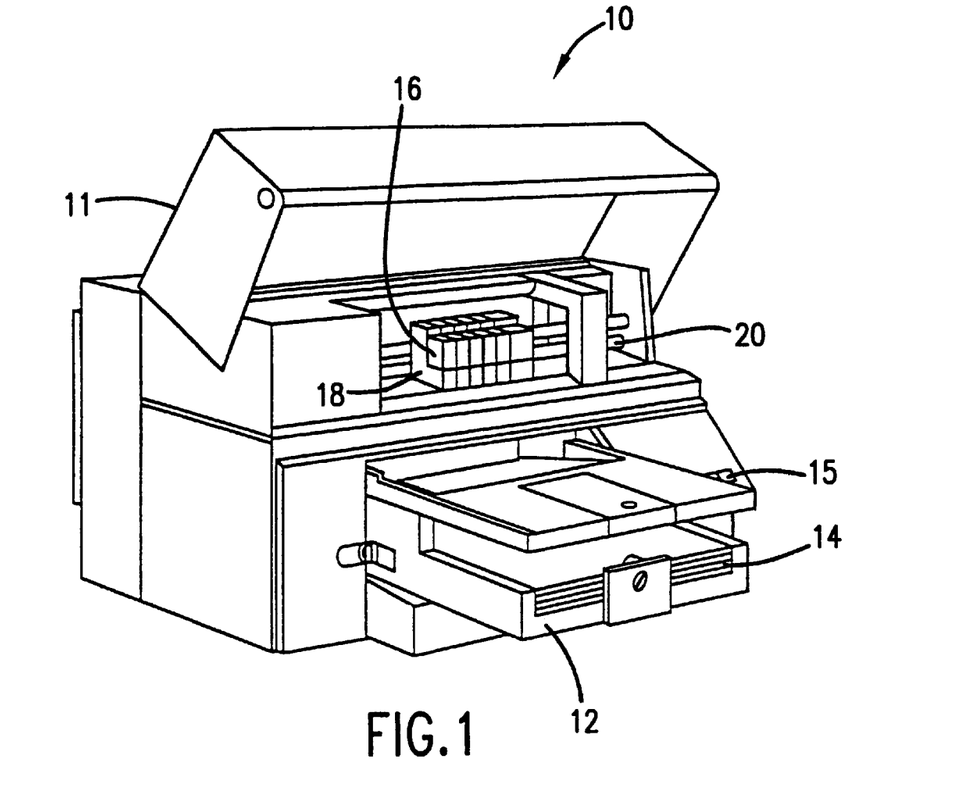
FIG. 1 illustrates an inkjet printer which incorporates at least a portion of the present invention.

FIG. 1 illustrates one type of color inkjet printer 10 which includes processing circuitry for performing all or part of the error diffusion method described herein. The color inkjet printer includes a cover 11, a paper tray 12 for holding virgin paper 14, an output tray 15 for receiving the printed pages, color ink print cartridges 16, and a scanning carriage 18 for sliding along a slide bar 20 while dots are being printed on the paper. In one embodiment, the color print cartridges 16 include light cyan (Cl), dark cyan (Cd), light magenta (Ml), dark magenta (Md), yellow (Y), and black (K) ink print cartridges. Other combinations of ink, such as the more traditional CMYK or CMY ink print cartridges, may also be used. Further, a separate print cartridge need not be provided for each color ink; a single replaceable print cartridge may include two or more colors of ink with an associated array of ink ejection nozzles for each color. Also, the ink supply for each of the scanning printheads may be stationary and connected to the printheads by a tube. Inkjet print cartridges and inkjet printers are well known to those of ordinary skill in the art. U.S. Pat. No. 5,594,481, entitled Ink Channel Structure for Inkjet Printhead, to Brian J. Keefe et al., describes the structure of a suitable inkjet print cartridge. This patent is assigned to the present assignee and incorporated herein by reference.

Figure 2:
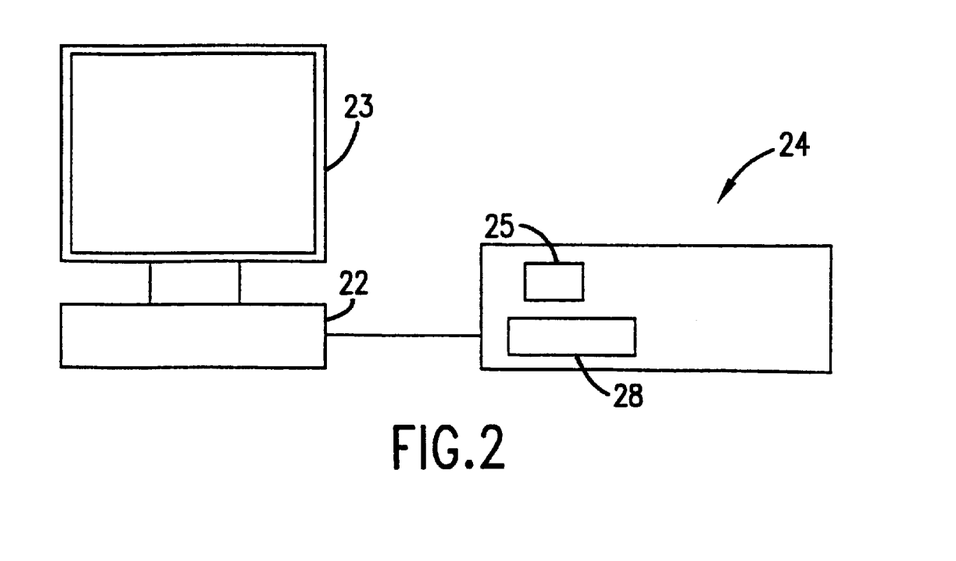
FIG. 2 illustrates a computer system and printer which incorporates the present invention.

FIG. 2 is a schematic diagram of a printing system which includes a host computer 22, a monitor 23 (e.g., a CRT), and a printer 24. Printer 24 could be any type of printer which prints color dots, including an inkjet printer. Printer 24 includes color print cartridges 25 which scan across a medium and print droplets of color ink as described below. Printer 10 of FIG. 1 may be substituted for printer 24 of FIG. 2.

Printer 24 includes a printer controller 28 which receives coded signals from computer 22 and provides firing signals to the print cartridges 25 to print color dots. The print cartridges may print at 300 dots-per-inch (DPI), 600 dpi, or any other resolution. If multiple drops of the same color ink are to be deposited over the same pixel position (or dot position) to print a multi-drop ink spot on a medium, the carriage containing print cartridges 25 may make multiple scans across the medium to print such overlapping dots.

The techniques described herein for converting an RGB image generated by computer 22 to ink droplets ejected from print cartridges 25 may be implemented using a combination of hardware and software, where portions of the hardware/software are incorporated in computer 22 and other portions located in printer 24. The location of the hardware/software for carrying out this method is a matter of design choice.

Figure 3:
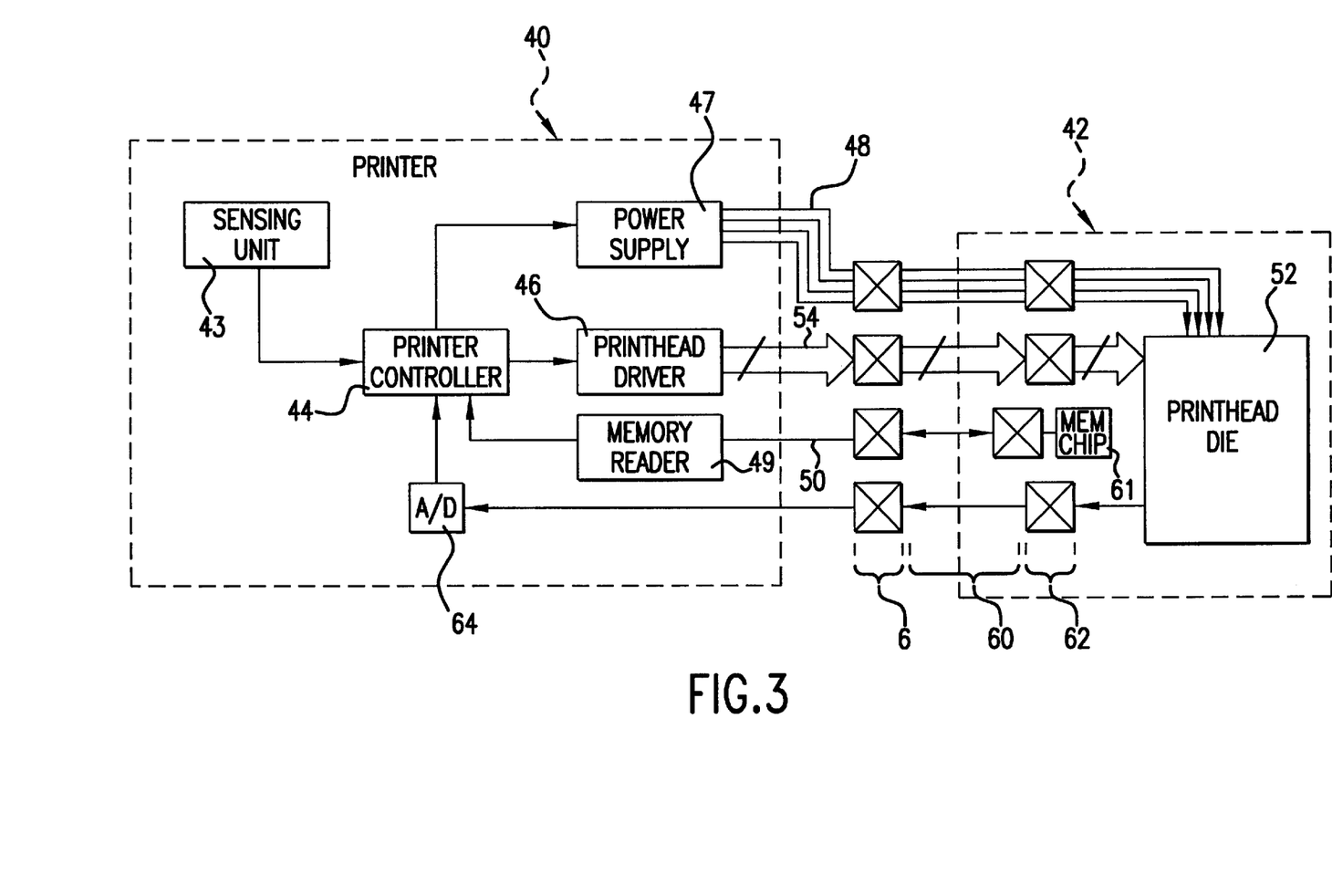
FIG. 3 is a schematic block diagram of a thermal inkjet printing apparatus according to a preferred embodiment of the invention.

FIG. 3 shows a schematic block diagram of an inkjet printer 40 with a connected print cartridge 42. A printer controller and memory unit 44 in the printer receives print data from a computer or microprocessor (shown in FIG. 2) and processes the data to provide printer control information or image data to a printhead driver circuit 46. A controlled voltage power supply 47 provides a controlled voltage to a multiple line power bus 48. An optical sensing unit 43 having a light source, a sensor and color filters is connected to the printer controller and memory unit 44. The use of the optical sensing unit is discussed in detail below. A memory reader circuit 49 in the printer 40 is connected to the controller 44 for transmitting information received from the print cartridge 42 via a memory line 50. The printhead driver circuit 46 is controlled by the controller 44 to send the image data to a printhead die 52 on the print cartridge 42 via a control bus 54 that has the number of lines required to control the firing of all the resistors.

The cartridge is removably replaceable and is electrically connected to the printer by the control bus 54, power bus 48 and memory line 50. A connector interface 56 has a conductive pin for each line on the printer side contacting a corresponding pad on a flexible circuit 60 on the cartridge 42. A memory chip 61 on the cartridge stores printer control information programmed during manufacture of the print cartridge and also by the printer during use. The flex circuit 60 is connected to the printhead die 52 via tab bonds 62. An analog-to-digital converter 64 in the printer is connected to the printhead to receive data from the printhead that indicates the printhead's temperature.

The printhead 52 has a large number of nozzles with a firing resistor associated with each nozzle. The resistors are individually addressable to provide unlimited pattern permutations, by a serial data stream fed from the printhead. Additional details regarding inkjet printheads are described in U.S. patent application Ser. No. 08/962,031, filed Oct. 31, 1997, entitled "Ink Delivery System for High Speed Printing" which is herein incorporated by reference.

To compensate for the color imbalance caused by the drop volume differences between inkjet print cartridges, some detection has to be done either on the print cartridge production line or at each individual printer. Calibrating print cartridges on the production line does not reflect a print cartridge's variance over its lifetime. Putting a sensor in each printer is an ideal way of approaching self color calibration. In this case, it is very important to extract the maximum amount of information from a simple device in order to minimize cost. Spectral modeling of mixing ink is a good technique in achieving this goal with fairly good accuracy. It can be used to calculate the spectral data, and then the color, of any ink combination based on the information of several primary color tiles. Each primary color tile is prepared by printing each of the primary inks on paper, one drop per pixel.

Figure 4A:
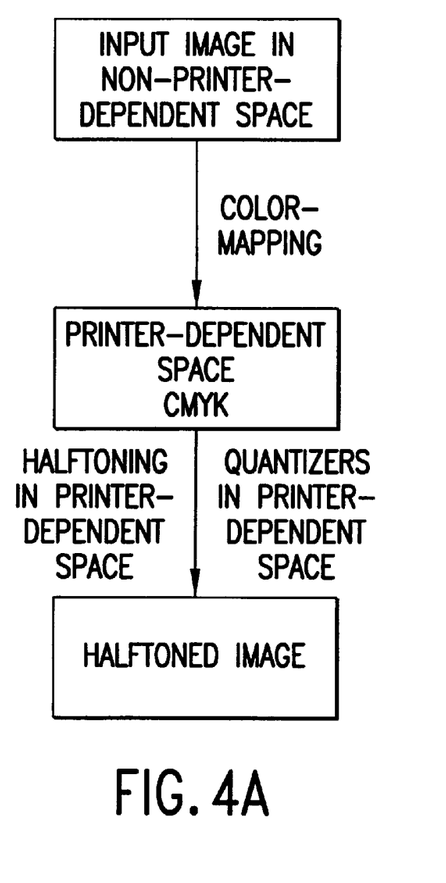
Figure 4B:
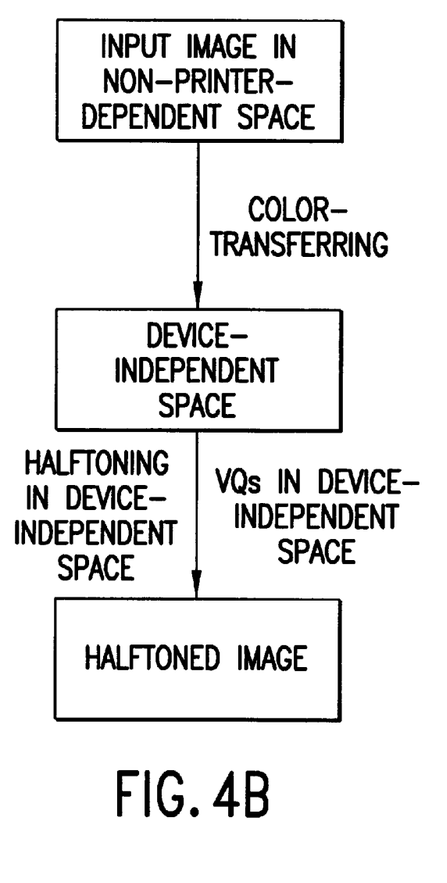

Color images with continuous tone can be printed by rendering among available ink combinations. This process, as we know, is called halftoning process. In conventional color printers, color halftoning is usually conducted independently in the C, M, Y and K components, which are printer-dependent color space. Input images need to be color mapped before the halftoning process. As shown in FIG. 4A, prior color mapping methods control the printed color by mapping device-independent color (e.g., CIELAB) or non-printer-dependent color (e.g., monitor RGB) to printer-dependent color (printer RGB or CMYK). The present invention uses halftoning in device-independent space, such as CIELAB or XYZ. The difference between these two approaches is shown in FIG. 4. As shown in FIG. 4B, color mapping is not necessary if halftoning is conducted in device-independent space. This saves a significant amount of time in the color image processing pipeline, as color transferring is less time-consuming than three-dimensional color mapping.

Vector error-diffusion is the most accurate halftoning algorithm for use in the device-independent approach, where colors of all available ink combinations can be imagined as vector quantizers, or device states, in a three-dimensional space. However, the present invention is not limited to halftoning with error diffusion and point or dither mask methods may also be used. In the case of traditional four-ink binary printers, there are only eight color vector quantizers (white, cyan, magenta, yellow, red, green, blue, and black). Current multi-pass, multi-drop, multi-ink printing system allows thousands of ink combinations to be printed without halftoning.

In the present invention, each printer has a light source, a sensor and color filters. The reflectance spectral data $R_{prim\_normOnPaper}$ of the standard primary color tiles printed by a nominal, or "standard," print cartridge on a particular paper and the reflectance spectral data $R_{Paper}$ of the same particular paper are measured by a spectrophotometer and saved as $\mu$ in the printer. The reflectance readings are made using the same type of light source, sensor and proper filters. These reflectance measurements may be made on the printer manufacturing line using nominal print cartridges and saved in printer memory for comparison with other cartridges installed in the printer at a later time.

Figure 5:
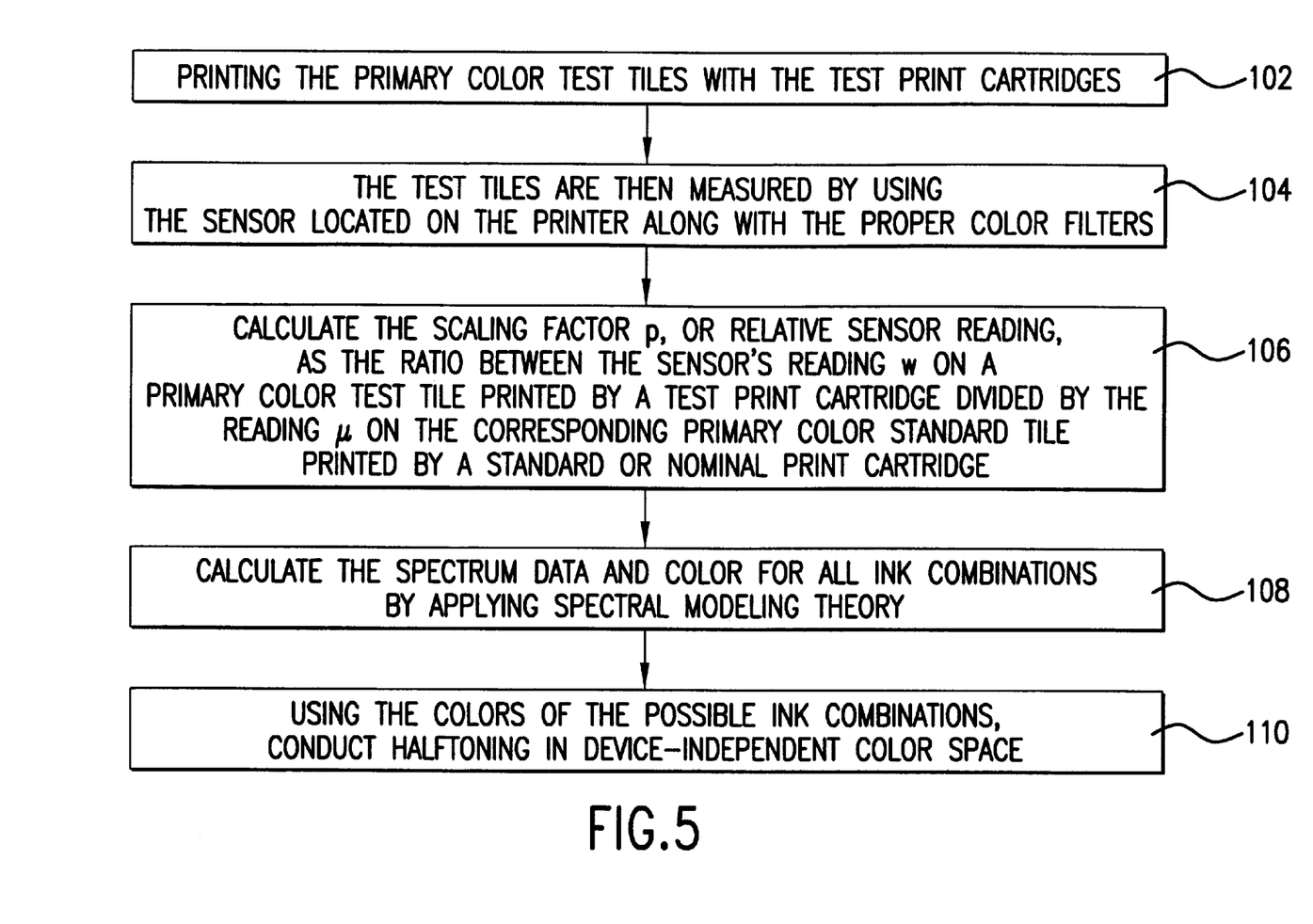
FIG. 5 is a flowchart showing the steps of the present invention.

An overview of the present invention is shown in FIG. 5. In step 102, the test tiles are printed with the installed print cartridges. In step 104, the test tiles are then measured by the built-in sensor through proper color filters. Each color filter is designed to be a narrow band-passing filter at the peak/valley wavelength of each primary ink's spectrum, (excluding black ink). The sensor's readings, w, on a primary test tile printed by the installed print cartridge are stored in memory.

In step 106, the scaling factor p is the ratio of the sensor's reading w on a primary test tile printed by the installed print cartridge divided by what the sensor's pre-measured readings, u on the corresponding standard primary tiles printed by a nominal, or standard reference, print cartridge would be. The u values were previously stored in memory. The scaling factor p is also called the relative sensor reading. In this subtractive printing system, if the installed print cartridge has the same drop volume as a nominal print cartridge, p equals 1.0. If the installed print cartridge has a low drop volume, p is greater than 1.0. If the installed print cartridge has a high drop volume, p is less than 1.0.

In step 108, the spectral data and colors are calculated for all ink combinations by applying spectral modeling theory. In step 110, halftoning is performed in device-independent color space. This halftoning may preferably performed by vector error diffusion using the possible colors of ink combinations as vector quantizers. The halftoning may also be accomplished with a point dither method.

The spectral modeling of step 108 will now be described. For inkjet printers, other than transparencies, most color images are printed on opaque substrates, i.e., plain paper, coated paper, or glossy photo paper. The primary spectral modeling theory for translucent and opaque substrates is Kubelka-Munk ("K-M") law. K-M theory models translucent and opaque substrates with two light channels traveling in opposite directions. The light is scattered and absorbed in only two directions, up and down.

The basic theory and derivations of K-M formulas are shown in equations (1) through (4). R, S, and K are functions of wavelength. The reflectance spectra, $R_{inf}$, can be measured by a spectrophotometer.

Equation (1) expresses two-constant K-M theory, in which parameters K and S are determined separately for a translucent film:

$$R=\{1-R_g[a-b\coth(bSx)]\}/[a-R_g+b\coth(bSx)] \quad (1)$$

where R is the reflectance of the film, $R_g$ is the reflectance of background, K is the absorption coefficient, S is the the scattering coefficient, $a=1+K/S$, $b=(a^2-1)^{1/2}$, or $[(K/S)^2+2(K/S)]^{1/2}$, $\coth(bSd)=[\exp(bSx)+\exp(-bSx)]/[\exp(bSx)-\exp(-bSx)]$ and x is the film thickness.

Equation (1) can be simplified to equation (2) using a single-constant theory for opaque substrates:

$$R_{inf}=1+(K/S)-[(K/S)^2+2(K/S)]^{1/2} \quad (2)$$

where $R_{inf}$ is the Reflectance at infinite thickness.

Equation (3) is a re-arranged version of equation (2) and is used to calculate the constant parameter, $(K/S)_{prim}$ for each of the primary colors.

$$(K/S)_{prim}=(1-R_{prim})^2/2R_{prim} \quad (3)$$

where $R_{prim}$ is the Reflectance spectrum of paper or a primary color

The constant $(K/S)_{mix}$ is calculated from:

$$(K/S)_{mix}=(K/S)_{substrate}+c_1(K/S)_{prim\_1}+c_2(K/S)_{prim\_2}+\ldots+c_n(K/S)_{prim\_n} \quad (4)$$

where $c_1, c_2, \ldots c_n$ is the concentration of the 1st, 2nd, and the n'th primary color.

Equation (4) can be modified by replacing the concentration of the 1st, 2nd, and the n'th primary color, $c_1, c_2, \ldots c_n$, with the drop number per pixel of the 1st, 2nd, and the nth primary ink, $d_1, d_2, \ldots d_n$ to obtain:

$$(K/S)_{mixOnPaper}=(K/S)_{paper}+d_1F(p_1)(K/S)_{prim-norm-1}+d_2F(p_2)(K/S)_{prim-norm-2}+\ldots+d_nF(p_n)(K/S)_{prim-norm-n} \quad (5)$$

where $c = d \cdot F(p)$ and $p_1, p_2, \ldots p_n$ are the relative sensor readings of the 1st, 2nd, and the nth primary tile.

Since both ink and paper contribute to $R_{prim-normOnPaper}$, these two factors have to be separated in the spectral modeling. $(K/S)_{prim-norm}$ is calculated by equations (6) through (8). In equation (8), ink concentration c is set to one because primary tile has one-drop ink per pixel, and p equals one. Once $(K/S)_{prim-norm}$ is obtained, $R_{prim-norm}$ can be calculated by equation (2).

$$(K/S)_{paper} = (1 - R_{paper})^2 / 2 R_{paper} \qquad (6)$$

$$(K/S)_{prim-normOnPaper} = (1 - R_{prim-normOn\ Paper})^2 / 2 R_{prim-normOnPaper} \qquad (7)$$

$$(K/S)_{prim-norm} = (K/S)_{prim-normOn\ Paper} - (K/S)_{paper} \qquad (8)$$

For a primary test tile, the concentration, $c_{prim-test}$ is a function of p. As discussed above, p is defined as the ratio of $R_{prim-testOnPaper}$ and $R_{prim-normOnPaper}$ at a certain wavelength and is obtained from the built-in sensing unit. Equations (9) through (12) derive the function F(p).

$$(K/S)_{prim-test} = C_{prim-test}(K/S)_{prim-norm} \qquad (9)$$

$$\begin{aligned}
c_{prim-test} &= F(p) = (K/S)_{prim-test} / (K/S)_{prim-norm} \qquad (10) \\
&= [(K/S)_{prim-testOnPaper} - (K/S)_{paper}] / \\
&\quad [(K/S)_{prim-normOnPaper} - (K/S)_{paper}] \\
&= [(1 - R_{prim-testOnPaper})^2 / 2 R_{prim-testOnPaper} - \\
&\quad (K/S)_{paper}] / [(1 - R_{prim-normOnPaper})^2 / \\
&\quad 2 R_{prim-normOnPaper} - (K/S)_{paper}]
\end{aligned}$$

$$R_{prim-testOnPaper} = p R_{prim-normOnPaper} \qquad (11)$$

$$\begin{aligned}
c_{prim-test} &= F(p) \qquad (12) \\
&= [1 - p R_{prim-normOnPaper})^2 / 2 p R_{prim-normOnPaper} - \\
&\quad (K/S)_{paper}] / [(1 - R_{prim-normOnPaper})^2 / \\
&\quad 2 R_{prim-normOnPaper} - (K/S)_{paper}]
\end{aligned}$$

Using the above equations, $(K/S)_{mixOnPaper}$ can be calculated from equation (5).

Figure 6:
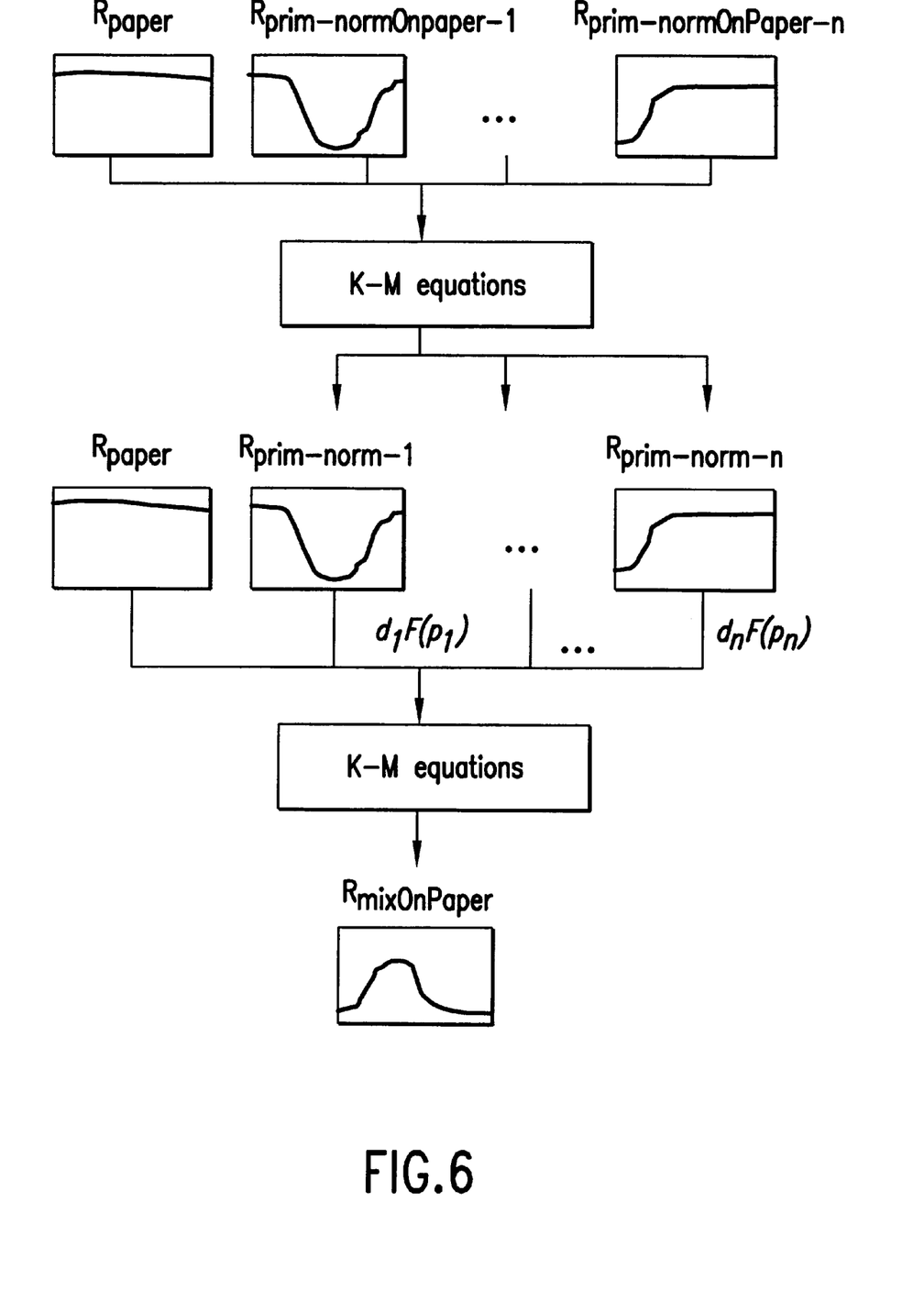
FIG. 6 is a flowchart showing the application of Kubelka-Munk theory to predict spectrum of mixed inkjet ink from the pre-measured spectrum of primary tiles.

FIG. 6 shows a flowchart of the process of applying K-M theory in inkjet mixing. The inputs are the reflective spectrum, $R_{Paper}$, for the un-imaged paper; the reflective spectrum $R_{prim\_normOnPaper}$ for each primary ink tile; the relative sensor reading, p, for each primary tile; and the drop number, d, of each primary ink in the mixed ink tile. $R_{Paper}$ and $R_{prim\_normObPaper}$ are pre-measured values saved in the printing system. The outputs are the spectra of the mixtures of primary inks on paper, $R_{mixOnPaper}$.

Figure 7:
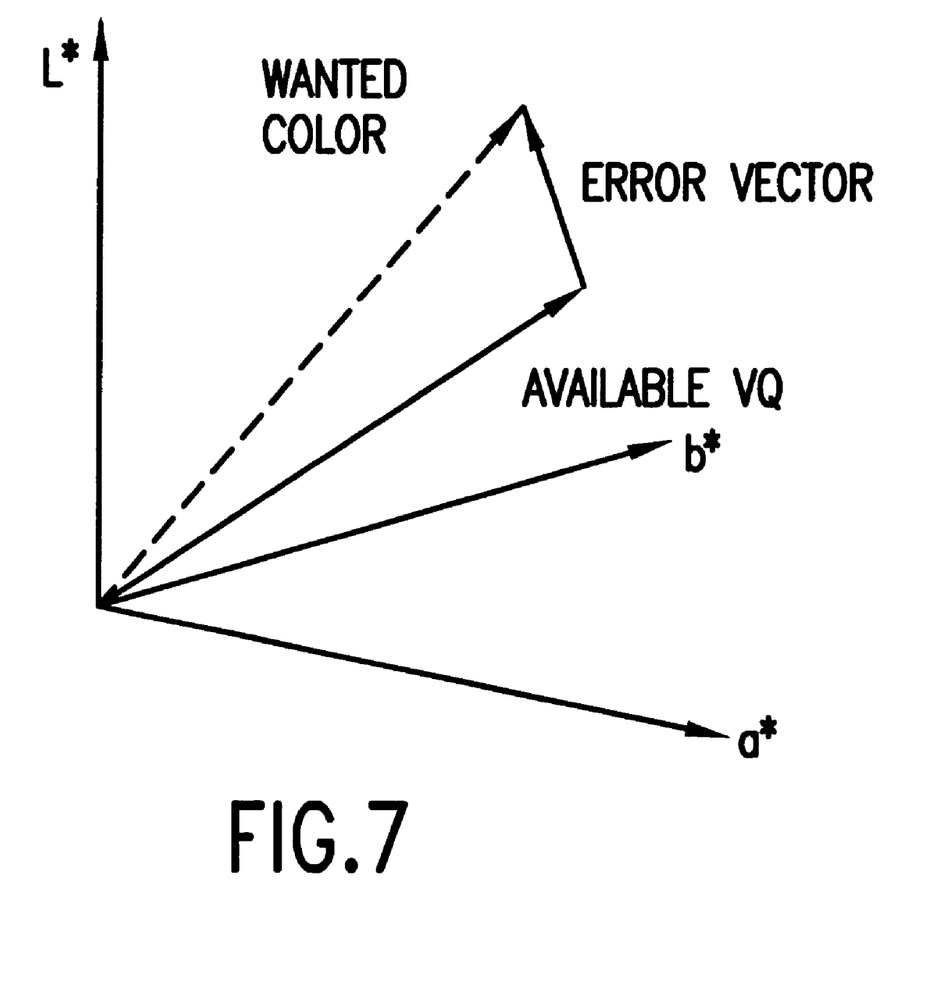
FIG. 7 is a graph showing the vector error-diffusion process.
Figure 8:
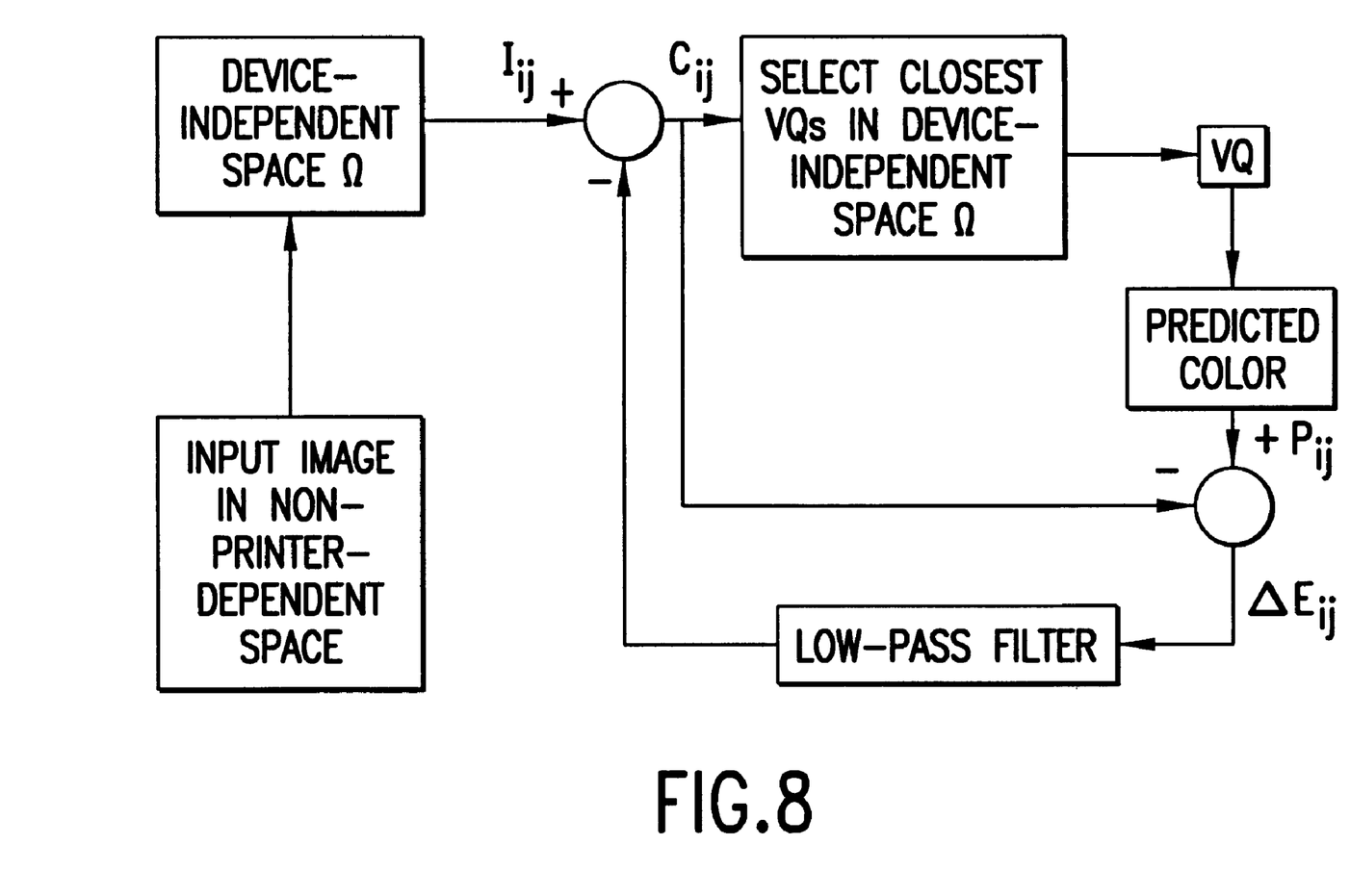
FIG. 8 is a schematic diagram showing vector error diffusion conducted in a general device-independent color space $\Omega$.

Vector error-diffusion in device-independent space is similar to the standard error-diffusion process, except it happens in 3-dimensional space. FIG. 7 is a graph showing the relationship between a wanted color, the available vector quantizers and the error vector. The process conducted in a general device-independent color space $\Omega$ is shown in FIG. 8. First, the color $I_{ij}$ of a selected pixel in input image is transferred into the space $\Omega$ by assuming a certain CRT model. The color vector $I_{ij}$ is then combined with the error vectors $\Delta E_{ij}$ propagated from previous pixels. The modified input color $C_{ij}$ is compared to all the color vector quantizers in the space $\Omega$. The color vector quantizers closest to $C_{ij}$ are chosen. This, in turn, means the corresponding ink combination and color $P_{ij}$ is chosen for the selected pixel. In the next step, the error vector $\Delta E_{ij}$ between the modified input $C_{ij}$ and $P_{ij}$ will be propagated to neighboring pixels based on certain error-diffusion weights. Further details of vector error diffusion can be found in U.S. Pat. No. 5,070,413, entitled "Color Digital Halftoning with Vector Error Diffusion," and U.S. patent application Ser. No. 08/960,779, filed Oct. 30, 1997, entitled "Device State Error Diffusion Technique for Halftoning," which are herein incorporated by reference.

Using a 300 dpi multi-pass printer with six primary ink channels, black (K), yellow (Y), dark cyan (Cd), light cyan (Cl), dark magenta (Md), and light magenta (Ml) inks, each primary color tile was prepared by printing each of the six primary inks (light cyan, dark cyan, light magenta, dark magenta, yellow and black) onto a print medium one drop per pixel. Full area coverage was obtained, since the single dot size was big enough to cover a 300 dpi pixel. The test target includes thousands of uniform color tiles, which are the mixture of primary inks with a known number of drops $(d_K, d_Y, d_{Cd}, d_{Cl}, d_{Md}, d_{Ml}$, which range from 0 to 4) of each primary ink per pixel. These uniform color tiles define the vector quantizers used in the error diffusion process discussed above. The primary color tiles l and paper's reflective spectra, $R_{prim-normOnPaper}$ and $R_{Paper}$, were measured by a spectra photometer. The constant $(K/S)_{prim-norm}$ was calculated by equation (8), and $(K/S)_{mixOnPaper}$ was calculated by equation (2).

The K-M model needs a correction for the refractive index which changes between air and a colored layer. In equation (13) the correction for the change in refractive index is a constant correction where a constant surface reflection, $R_s$, is subtracted from the measured reflectance, $R_m$.

$$R_{inf} = R_m - R_s \qquad (13)$$

where $R_m$ is the measured reflective spectrum and $R_s$ is a constant representing the surface reflection. While a single constant $R_s$ may be used to fit data for all wavelengths over the spectrum, better results are obtained by dividing the spectrum into multiple segments with each segment having its own constant $R_s$. This is because the refractive index changes with wavelength.

$\Delta E$ in CIELAB and the spectral difference between measured and predicted colors for each ink combination were also calculated. Calculated $R_{mixOnPaper}$ of each ink combination was also transferred to selected device-independent spaces. About one thousand ink combinations all over the color space are chosen as vector quantizers. The colors for all vector quantizers are properly scaled to ensure using the paper color as the white point. Vector error diffusion was conducted in CIELAB and SRGB color space. SRGB is a newly proposed device-independent color space standard based on a well-defined virtual CRT.

Because of its character of perceptual uniformity, CIELAB color space is a good start for reducing dithering granularity. In order to further reduce graininess, a modified CIELAB space is actually used where L*, a*, and b* are weighted differently when calculating the Euclidean distance between modified color $C_{ij}$ and color vector quantizers. The optimal weight ratio depends on printer resolution, ink dot size and concentration. In contrast to CIELAB color space, XYZ color space is a linear space, which tends to better preserve the color accuracy during vector error diffusion process. However, vector error diffusion conducted in XYZ color space is just slightly better than in CIELAB in terms of color accuracy. When vector error diffusion is conducted in CIELAB, the RGB values of input image need to be transferred into CIELAB according to a "standard" RGB, or SRGB. No extra step for color matching is needed. When vector error diffusion is conducted in SRGB space, not even color transferring is needed. Thus, the whole printing pipeline is further simplified.

Figure 9:
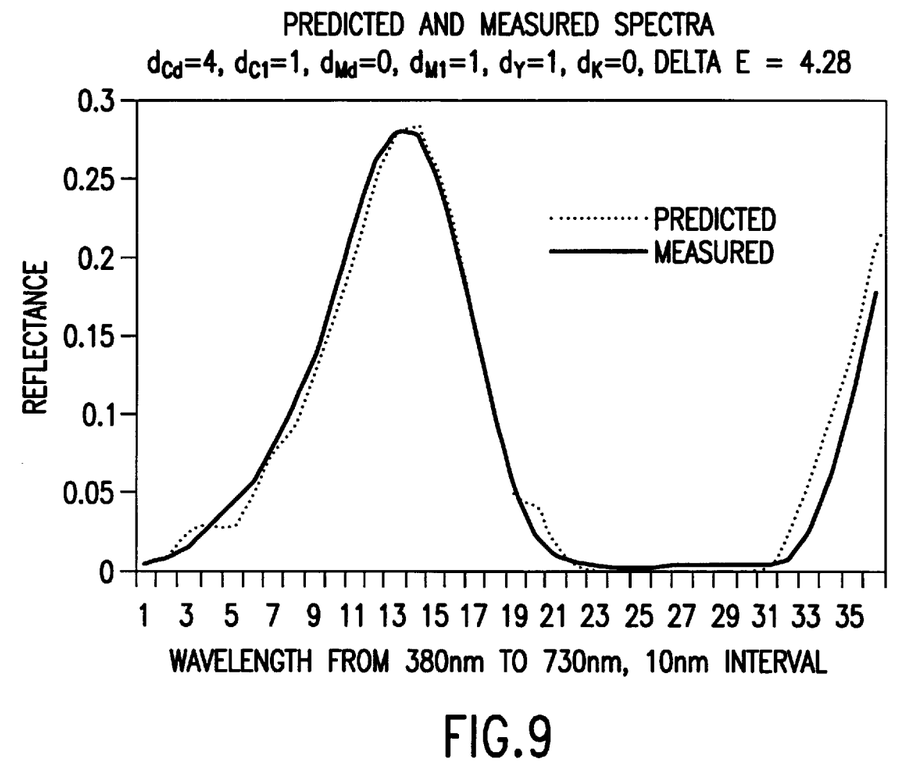
FIG. 9 is a graph illustrating an example of metameric pair, predicted and measured spectra.

The results of predicting color for ink combinations was evaluated. The average ΔE is 6.0 for all the uniform color tiles used in the vector error diffusion, excluding paper and the six primary colors. The predicted and measured colors are metameric pairs because their colors in L*a*b* space were very close, but the spectra were not exactly the same. However, the average spectral difference was less than 1%. FIG. 9 is an example of the experimental results.

To evaluate the accuracy of the color reproduction, 9×9×9=729 evenly spaced RGB color tiles were printed using the vector error diffusion process. The process was conducted in CIELAB. SRGB is assumed as the CRT standard when calculating the predicted CIELAB from input RGB. The predicted CIELAB colors were compared to the measurement of the printed colors. An average ΔE of 13.46 is achieved for all the 729 tiles. As a significant portion of desired colors are out of the printer's color gamut, it was helpful to find the average ΔE, 6.26 for tiles within gamut. When the vector error diffusion is conducted in SRGB space, an average ΔE of 17.67 is achieved for all the 729 tiles. The average ΔE is 8.83 for tiles within the color gamut.

The shape of inkjet dots is substantially round and not square as are the pixels. Also, the size of inkjet dot increases with an increasing number of ink drops per pixel. A large number of ink drops on a specific pixel will tend to cover part of the area of neighboring pixels. This has little impact on a uniform area where every pixel uses the same ink combination. However, when the neighboring pixel uses a different ink combination, the color of neighboring pixels will be changed. Various printing models have been developed to compensate for these specific characteristics of binary printers. These models may be used in the vector error diffusion step of assigning a color to a selected pixel from the chosen vector quantizers.

Although some errors exist in the printing pipeline, they are systematic and stable. Once the K-M model is well established, color balance of the output depends solely on the sensor reading. It means that an individual user can perform color calibration efficiently and easily.

While the above is discussed in terms of specific and alternative embodiments, the invention is not intended to be so limited.

What is claimed is:

1. A method for use in printing; said method comprising the steps of:

printing a primary color test tile using at least one print cartridge installed in a printer;

measuring the primary color test tile printed by the installed at least one print cartridge by using an optical sensor located on the printer to obtain a primary color test tile measured value;

first calculating a scaling factor by dividing the primary color test tile measured value by a measured value of a standard primary color test tile previously printed by a standard print cartridge and measured by the optical sensor, the measured value of a standard primary color test tile having been stored in the printer;

second applying the calculated scaling factor in calculating spectral data and colors for primary ink combinations by applying spectral modeling; and using the calculated spectral data and colors of the primary ink combinations to perform halftoning in device-independent color space; and wherein:

the printing step comprises applying primary color onto a printing medium;

the measuring step comprises measuring the applied primary color as it appears on said printing medium, and also measuring appearance of said printing medium alone; and the applying step comprises the substeps of:

isolating color effects of the applied primary color alone from the measured applied primary color as it appears on said printing medium, predicting color effects due to the applied primary color alone when mixed with color effects of other applied primary colors alone, and modifying the predicted color effects of mixed applied primary colors alone by reintroducing influence of a printing medium on said predicted color effects.

2. The method of claim 1, wherein:

the isolating substep comprises applying color modeling equations to data resulting from the steps that precede the applying step;

the predicting substep comprises applying color modeling equations to data resulting from the isolating substep; and the modifying substep comprises applying color modeling equations to data resulting from the predicting substep.

3. A method for use in printing; said method comprising the steps of:

printing a primary color test tile using at least one print cartridge installed in a printer;

measuring the primary color test tile printed by the installed at least one print cartridge by using an optical sensor located on the printer to obtain a primary color test tile measured value;

first calculating a scaling factor by dividing the primary color test tile measured value by a measured value of a standard primary color test tile previously printed by a standard print cartridge and measured by the optical sensor, the measured value of a standard primary color test tile having been stored in the printer;

second applying the calculated scaling factor in calculating spectral data and colors for primary ink combinations by applying spectral modeling; and using the calculated spectral data and colors of the primary ink combinations to perform halftoning in device-independent color space; and wherein the using step comprises:

receiving or initiating image data including an array of desired color specifications;

then, if the desired color specifications are not received or generated in a device-independent color space, expressing the desired color specifications in a device-independent color space;

then based upon one of the desired specifications, which corresponds to a particular image position, generating an adjusted desired color for said particular image position;

selecting an available color, from known available colors, based substantially upon distance, in the device-independent color space, from the adjusted desired color; and designating the selected available color for printing at the particular image position; and further wherein:

the generating step comprises combining said one of the desired specifications, expressed in the device-independent color space, with previously distributed error values to form an adjusted desired color in the device-independent color space.

4. The method of claim 3, further comprising the steps of, after the selecting step:

also designating said distance as a color error for the particular image position; and distributing the color error to positions in the image near the particular image position.

5. A method for use in printing; said method comprising the steps of:

acquiring photometric measurements of primary colors test-printed by a printer, as the primary colors appear on a printing medium;

applying spectral modeling to the acquired photometric measurements to obtain a quantitative characterization of primary colors as printed by the printer; and using the quantitative characterization to perform halftoning; and wherein:

the applying step comprises applying spectral modeling equations derived from a Kubelka-Monk analysis.

6. A method for use in printing; said method comprising the steps of:

acquiring photometric measurements of primary colors test-printed by a printer, as the primary colors appear on a printing medium;

applying spectral modeling to the acquired photometric measurements to obtain a quantitative characterization of primary colors as printed by the printer; and using the quantitative characterization to perform halftoning; and wherein the applying step comprises the substeps of:

isolating color effects of the applied primary colors alone from the measured applied primary colors as they appear on said printing medium;

predicting color effects due to the applied primary colors alone when mixed with each other; and modifying the predicted color effects of mixed applied primary colors alone by reintroducing influence of a printing medium on said predicted color effects.

7. The method of claim 6, wherein:

the acquiring step further comprises measuring appearance of said printing medium alone.

8. The method of claim 6, wherein:

the predicting and modifying steps, considered together, comprise application of equation (5).

9. Apparatus for printing color images, comprising:

means for receiving or initiating image data including an array of desired color specifications;

means for, if the desired color specifications are not received or generated in a device-independent color space, expressing the desired color specifications in a device-independent three-dimensional color space;

means for generating, based upon one of the desired specifications, which corresponds to a particular image position, an adjusted desired color for said particular image position;

means for selecting an available color, from known available colors, based substantially upon distance, in the device-independent three-dimensional color space, from the adjusted desired color;

means for designating the selected available color for printing at the particular image position;

means for automatically preprinting, and performing photometric measurements of, primary colors that are printable by the apparatus; and means for applying color modeling to results of said photometric measurements, to establish said known available colors;

wherein the applying means comprise means for applying equation (5).

10. The apparatus of claim 9, wherein:

the applying means comprise further comprise means for applying equation (2).

11. Apparatus for printing color images, comprising:

means for receiving or initiating image data including an array of desired color specifications;

means for, if the desired color specifications are not received or generated in a device-independent color space, expressing the desired color specifications in a device-independent three-dimensional color space;

means for generating, based upon one of the desired specifications, which corresponds to a particular image position, an adjusted desired color for said particular image position;

means for selecting an available color, from known available colors, based substantially upon distance, in the device-independent three-dimensional color space, from the adjusted desired color; and means for designating the selected available color for printing at the particular image position;

wherein the generating means comprise means for combining said one of the desired specifications, expressed in the device-independent color space, with previously distributed error values to form an adjusted desired color in the device-independent color space.

12. The apparatus of claim 11, further comprising:

means for also designating said distance as a color error for the particular image position; and means for distributing the color error to positions in the image near the particular image position.

* * * * *